INVENTORS
WILLARD C. HAYS
GEORGE I. DOERING

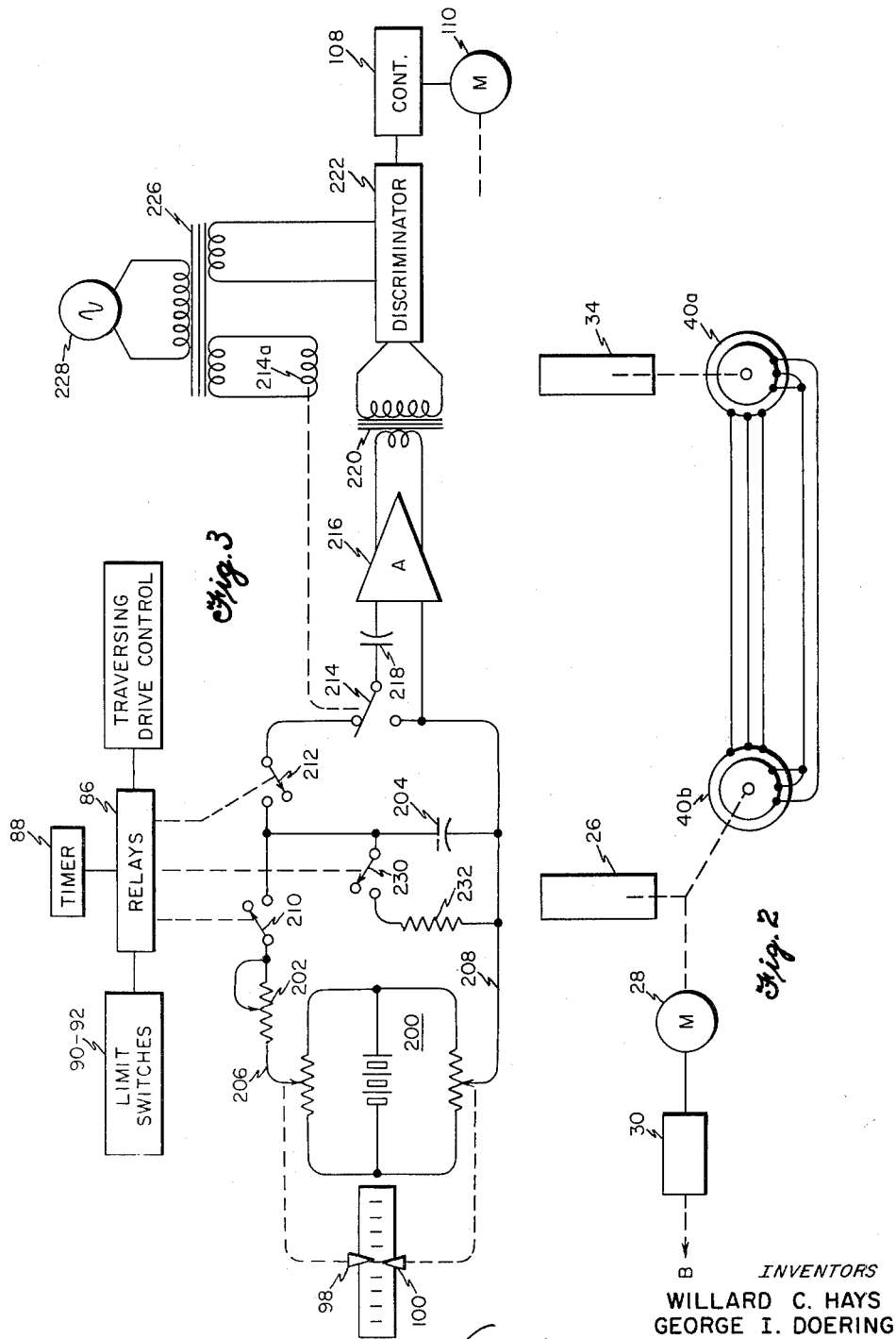

United States Patent Office 3,015,129
Patented Jan. 2, 1962

3,015,129
EXTRUSION PROCESS CONTROLS
Willard C. Hays and George I. Doering, Columbus, Ohio, assignors to Industrial Nucleonics Corporation, a corporation of Ohio
Filed Mar. 3, 1958, Ser. No. 718,675
6 Claims. (Cl. 18—12)

This invention relates to continuous extrusion processes such as plastics extrusion, and more specifically it relates to control apparatus for automatically maintaining a desired uniformity of the product.

The invention will be illustrated and described in connection with continuous sheet extrusion, although many of the principles herein set forth are as well applicable to other types of extrusion processes.

The growth of plastics extrusion industries is proceeding at an exponential rate such that the increase in the number of extruder installations has outstripped the supply of experienced operators available to run the machines. Furthermore, even with fully experienced personnel, the set up and operating adjustments often involve rather time-consuming and inefficient procedures, with obvious economic disadvantage to the producer. This is true particularly in the case of short run products, due to the fact that drifts occur in the early part of a production run wherein much raw material must be scrapped. Although thermosetting plastic scraps can often be comminuted and reused, much valuable machine time is wasted in any event, with the result that the producer obtains less than a maximum return on his capital equipment investment in expensive extrusion machinery.

In accordance with the present invention, the extruded product is measured continuously by a non-contacting gauge utilizing a penetrative radiation source and a radiation detector. In addition to providing accurate measurement, the gauge is adapted to provide an electrical signal indicating the presence of any error in the measured variable. The error signal is utilized by a control device which automatically regulates one of the machine adjustments so as to maintain the measured variable substantially constant at the desired value.

The invention is herein exemplified in conjunction with a sheet material extruder, polisher and pull-roll system. Control of sheet thickness in such a process may be effected by automatic regulation of one of three variable machine settings; i.e., by varying the speed of the extruder screw, by varying the speed of the take-off including the polishing rolls, or by varying the speed of the pull rolls or other take-off conveyor alone.

An important feature of the present invention as applied to a sheeting process is the provision of a device which may be termed a "scanning integrator" which is incorporated into the control system to average the thickness error signal derived from thickness measurements across the width of the sheet. In this system the gauging head containing the radiation source and detector periodically traverses across the width of the sheet, and the continuum of measurements obtained throughout each such traverse are electronically averaged to obtain the error signal which is the basis of a subsequent correction to the setting of the controlled machine adjustment, where such adjustment is required.

It is the object of this invention to provide means for maintaining a substantially uniform weight or thickness quality in the product of a continuous extrusion process.

It is another object to provide means for quickly and automatically restoring a desired weight or thickness quality of an extruded product whenever said quality varies from the desired value during the manufacture of the product.

It is still another object to provide means for rapidly and automatically setting up at least one major adjustment to an extrusion machine so as to minimize the production of scrap at the outset of a production run.

It is a further object to provide automatic apparatus whereby relatively inexperienced personnel may operate an extrusion machine with results comparable to or exceeding the performance of skileld and thoroughly experienced operators.

It is a still further object to provide an automatic measuring and controlling apparatus for a sheet material extruder whereby control action is based upon integrated measurements across the total width of the sheet.

Further objects and advantages will become apparent in the following detailed description, taken in conjunction with the appended drawing, in which:

FIG. 2 is a diagram showing a variation in the apparatus of FIG. 1 and an adaptation of the control equipment of the invention thereto.

FIG. 3 is a diagram showing in more detail a portion of the control equipment of FIG. 1.

Figure 1:
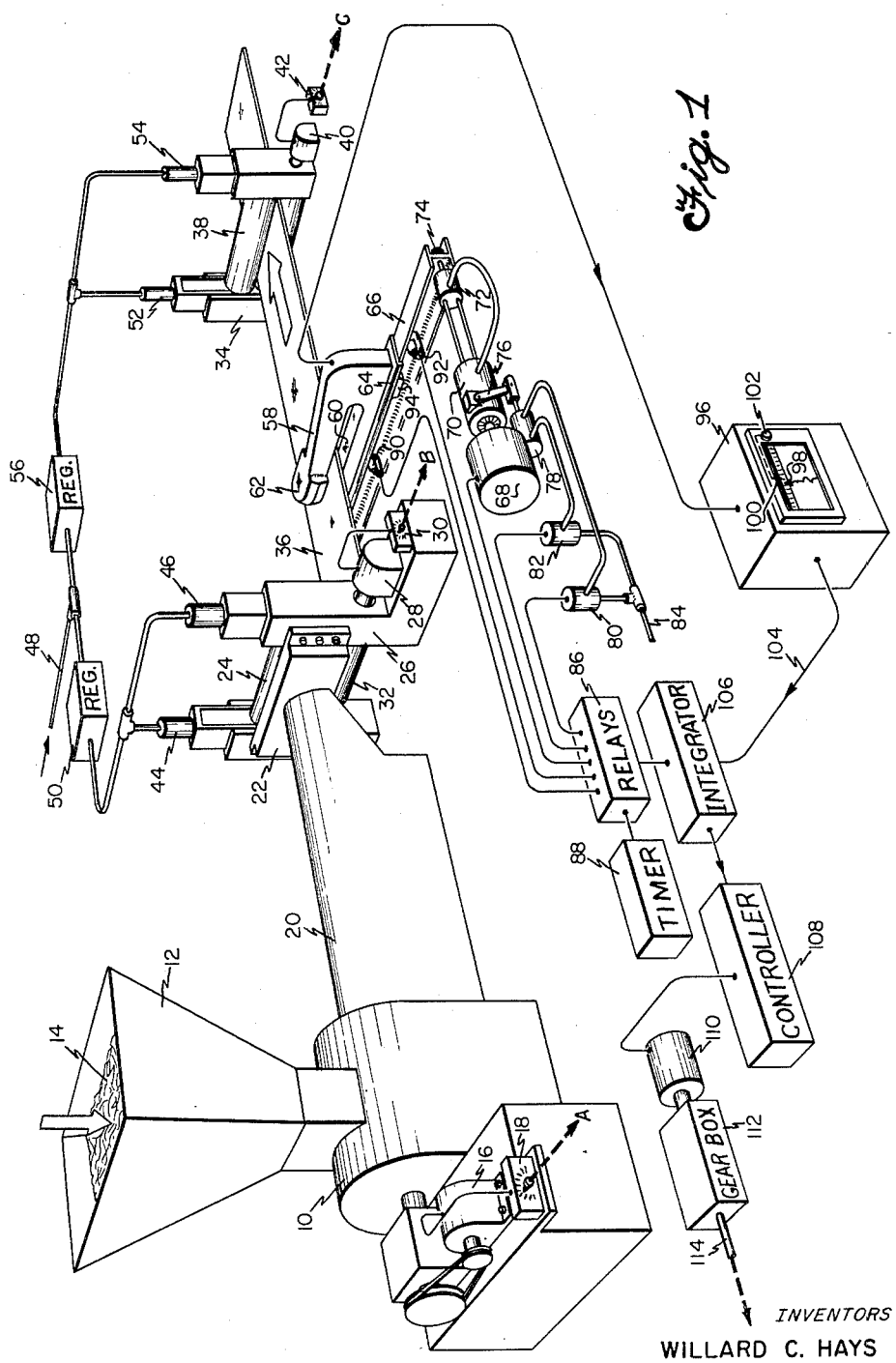
FIG. 1 is a perspective showing of an extrusion apparatus and control equipment for automatic regulation of the same in accordance with the invention.

Referring to FIG. 1, there is shown a conventional extruder 10 having a hopper 12 for receiving a supply of plastic ingredients 14. The extruder 10 is driven through suitable power transmission and speed-reduction means by a motor 16 having conventional speed regulating means 18 in circuit therewith. Through a combination of physical mastication and elevated temperatures developed adiabatically or in combination with externally applied heat, the plastic ingredients are thoroughy mixed and convered to a liquidous state, and are pumped under pressure through a cylinder bore incorporated in the screw housing 20 by the conventional elongated extruder screw (not shown) rotating therein.

The liquidous plastic emerges through an elongated slit (not shown) in the sheeting die 22 communicating with the extruder output, so as to form a wide, uniformly thin stream of heavy viscous plastic which is ejected contiguous to the nip of a pair of rolls as at 24 in the polishing roll stand 26.

The stand 26 ordinarily includes at least three polishing rolls as at 24 which are temperature controlled and driven by means such as a motor 28 having a conventional speed control 30. The semi-liquidous plastic sheet is ordinarily half-looped around the center roll (not visible) and the bottom roll 32, and emerges in the direction of the pull-roll stand 34.

Since the still-warm plastic sheet as at 36 is easily deformable by tensile and gravity stresses, the same is generally carried on closely spaced idler rolls (not shown for clarity) which support the sheet from below during its passage from the polish-roll stand 26 to the pull-roll stand 34.

The pull-rolls as at 38 ordinarily are rubber-surfaced to provide positive traction with the sheet 36 to effect the transport of the same; or if desired, to bring about a drafting elongation thereof by running the roll stand 34 at a higher peripheral speed than that of polish-roll stand 26. The pull-rolls as at 38 are power-driven by means such as a motor 40 having a speed control 42.

The pressure between the rolls of the polish-roll stand 26 is provided by a pair of piston and cylinder devices 44 and 46. These devices are connected to a suitable source (not shown) of fluid pressure delivered to line 48, through a pressure regulator 50. Similar piston and cylinder devices 52 and 54 for applying roll pressure on the pull-roll stand 34 are supplied with fluid pressure through regulator 56. By virtue of regulators 50 and 56, the squeeze applied to the plastic sheet between rolls is maintained substantially constant.

In accordance with this invention, a radiation gauge provides a continuous measurement of the thickness of the sheet 36 issuing from the polishing rolls. The radiation gauge is similar to that described in a co-pending application, Serial No. 286,220, filed May 5, 1952, by Henry R. Chope, now U.S. Patent 2,829,268, and includes a pair of spaced arms 58 and 60 adapted to embrace the width of the sheet 36 without contacting the same. The lower arm 60 carries a radioactive source (not shown) of penetrative radiation such as beta radiation, and the upper arm 58 carries in housing 62 a radiation detector responsive to the radiation from the source which is not absorbed in the thickness of the sheet 36.

The gauging head described sits on a wheeled carriage 64 which is borne upon a horizontally disposed steel I-beam track 66. The carriage 64 is driven by a power traversing mechanism comprising a constant speed reversible electric motor 68 and power transmission means including a variable displacement hydraulic pump 70 and connected hydraulic motor 72 such as are manufactured by Vickers Incorporated, Detroit, Michigan. The rotary motion of the hydraulic motor shaft is converted to linear motion of the carriage 64 by means of a chain and sprocket mechanism shown partially at 74. The transmission means is adapted for two-speed operation by providing a shifting lever 76 controlling the displacement of pump 70; the lever 76 being operated automatically by coupling the same to an air piston and cylinder assembly 78, which is in turn controlled by electrically actuated solenoid valves 80 and 82 connected to an air pressure line 84.

The operation of air valves 80 and 82 is controlled by a network of relays 86. The relay system also controls the electric drive motor 68 to start, stop and reverse the same. Relay network 86 is interconnected with an electric timer 88 and means responsive to the position of the carriage 64 on the track 66, which means is here illustrated as a pair of snap-action switches 90 and 92 adjustably secured to track 66 and having roller arms engageable by an actuator cam 94 which is bolted to the carriage 64.

The traversing system for the gauge is designed to automatically carry out a repetitive cycle of scanning operations as follows. Assume the gauging head is traveling at slow speed toward the far side of the sheet. As the radiation source and detector head 62 approaches the edge of the sheet 36, the actuator 94 will strike limit switch 90, tripping a relay in the network 86. These relays remove power from the motor 68 to stop further movement of carriage 64 and apply power to the timer 88. After a few seconds the timer "times out," tripping relays in network 86 which interchange the positions of solenoid valves 80 and 82, causing the air cylinder 78 to shift hydraulic pump 70 to high displacement; the relays 86 at the same time energizing drive motor 68 to run in the opposite direction.

The gauging head now travels at fast speed backwardly across the sheet 36 until it approaches the near edge thereof, whereupon the actuator 94 will strike limit switch 92, tripping a relay in the network 86, removing power from the drive motor 68 to stop the movement of the gauging head and again starting the timer 88. The gauging head is again allowed to rest a few seconds, this time adjacent to the near edge of the sheet, until the timer again times out. Thereupon the relay network causes the pump 70 to shift to low displacement and applies power to the drive motor 68 in the reverse direction, to restore the assumed condition wherein the gauging head was slowly traversing across the sheet 36 toward the far side thereof.

As the gauging head scans the sheet 36 from edge to edge, the thickness profile of the sheet is measured and registered on a recording device 96 in the manner set forth in the copending application above identified. The recorder 96 includes means for comparing the measured thickness as indicated by a measuring pointer 98 with a desired thickness indicated by a target pointer 100 which is adjustable by means of a setting knob 102. The result of the comparison is an electrical error signal on line 104 which is fed into an integrator 106.

The integrator 106 averages the error signal obtained during each fast-speed side-to-side scanning movement of the gauging head across the width of the sheet 36. The integrated error signal is then fed to a controller 108 which controls the application of power to a motor 110 so as to stop, start, and reverse the same in accordance with the demands of the integrated error signal. The motor 110 is arranged to drive an actuator shaft 14 through a set of suitable speed reduction gears 112.

There are at least three ways in which the rotation of actuator shaft 114 may be utilized to achieve feedback control of the thickness of the plastic sheet. The choice to be made depends upon the plastic materials used, the desired characteristics of the finished sheet and the nature of the extruding operation and machinery involved, which obviously may be quite different from the particular system illustrated without departing from full equivalency insofar as the present invention is concerned.

Firstly, the actuator shaft 114 may be mechanically coupled as at "A" to rheostat 18 so as to vary the speed of the extruder screw by controlling the speed of the driving motor 16 therefor. Obviously other methods of controlling the speed of an extruder screw by means of the actuator shaft 114 may be adapted with other types of variable speed extruder drive systems. In this arrangement, the speed of the polish-roll stand 26 and pull-roll stand 34 is maintained relatively constant.

Secondly, in another embodiment of the invention the extruder screw speed is maintained substantially constant by a fixed setting of the regulator 18, and the control actuator shaft 114 is connected to the polish-roll stand speed regulator 30 as at "B" so as to vary the speed of the polishing rolls. With this arrangement, it is necessary to synchronize the speed of the pull-roll stand 34 with the variable speed of the polishing rolls. One arrangement for such speed synchronization is depicted in FIG. 2, wherein the variable speed drive motor 40 for the pull-roll stand 34 is replaced by a synchro-tie 40a and 40b with the polish-roll stand drive motor 28. Element 40b may comprise a transmitter and element 40a may comprise a follower of the type which is manufactured and marketed under the trade name "Selsyn" by General Electric Company. The transmitter 40b is connected so as to be mechanically driven by motor 28 which drives the polish-roll stand 26, while the receiver 40a, in angular synchronism with transmitter 40b, in turn drives the pull-roll stand 34. In this second embodiment, the extrusion apparatus is essentially reduced to an extruder and take-off means, the polish-roll stand 26, conveyor (not shown) and pull-roll stand 34 constituting elements of the take-off means.

In a third embodiment, the arrangement is again essentially as depicted in FIG. 1, but in this case the extruder screw and polish rolls are both maintained at relatively constant speed by regulators 18 and 30 while the speed of the pull-roll stand is made controllably variable by connecting the control actuator shaft 114 to the speed regulator 42 as indicated at C. In this arrangement, the thickness of the plastic sheet is controlled by varying the speed differential between the pull-rolls 34 and the polish rolls 26, thus determining the amount of stretch applied to the sheet between the respective roll stands. Since due to this stretch the thickness of the sheet 36 may change significantly during its passage between roll stands, the measuring instrument is relocated so as to measure the sheet at the output side of the pull-roll stand 34 rather than at the output of the polish-roll stand 26 as shown.

FIG. 3 is a representation, partly diagrammatic and partly in circuit detail, of a portion of the control apparatus of FIG. 1, featuring the scanning integrator device whose overall functioning is described hereinabove. Referring now to this figure, there is shown a comparison network 200 whereby a unidirectional electrical signal proportional to the difference between the indications of the measuring pointer 98 and the target pointer 100 of the recorder 96 is derived in a manner fully described in a co-pending application, Serial No. 688,720, filed October 17, 1957, by Donald E. Varner. Inasmuch as said application also provides a full description of the controller 108, such description is omitted from this specification.

The integrator basically comprises a simple resistance-capacitance circuit including a rheostat 202 and integrating capacitor 204 whereby a variable D.C. error signal appearing across lines 206 and 208 is averaged when a relay switch 210 is closed. It is found that the voltage across capacitor 204 is accurately proportional to the time integral of the error signal, providing that the time-constant of the resistor-capacitor combination is at least about five times as great as the time of integration. This time-constant is variable by changing the resistance value of rheostat 202.

The voltage across capacitor 204, although proportional to the integral of the error signal, is much reduced in magnitude therefrom; requiring amplification before delivery to the input of the controller 108 which is designed to handle the raw error signal appearing across lines 206 and 208. Accordingly when a relay switch 212 is closed, the voltage appearing across integrating capacitor 204 is converted to a square wave signal by a conventional chopper modulator switch 214 and fed to an intermediate amplpifier 216 through a coupling capacitor 218. The output of amplifier 216 is coupled by means of a transformer 220 to a rather conventional discriminator circuit 222 which provides a unidirectional output voltage, proportional to the voltage across the integrating capacitor but suitable to the requirements of the controller input to which it is connected.

A transformer 226, connected to the conventional 60 c.p.s. power source 228, provides an alternating voltage for energizing the driving coil 214a of the chopper 214, and also provides a reference input voltage for the discriminator 222.

In connection with the apparatus of FIG. 1, the integrator system functions as follows. Assume that the integrating capacitor is discharged when the detector head 62 begins a fast scanning movement across the sheet 36. Relay switch 210 will close as the scan starts, the relay switch 212 being open. As the gauge measures the profile of the plastic sheet, any error signal voltages developed by network 200 will charge capacitor 204 through resistance 202.

At the end of the fast scan, the charge on capacitor 204 will be proportional to the average value of the error signal obtained on the scan. Thereupon switch 210 will be opened by relay network 86 to disconnect the error signal input, and switch 212 will close to connect the capacitor 204 to the amplifier 216 through the chopper 214 and coupling capacitor 218. This connection obtains while the traversing gauge rests at the edge of the sheet, and the timer 88 is running. The integrated and amplified error signal appearing at the output of the discriminator 222 will now feed into controller 108, which if necessary will make a correction to the process adjusting means coupled as at A, B, or C to actuator shaft 114, in the manner set forth in the co-pending application of Varner, above cited.

When the timer 88 times out, and the traversing gauge begins its slow scan across sheet 36, switch 212 is opened; switch 210 being already open as aforesaid. A further relay switch 230 now closes, discharging the integrating capacitor 204 through resistor 232 while the gauge completes the slow scan. At the end of the slow scan, relay switch 230 is opened, whereupon the operation sequence is repeated.

While the invention has been described as a specific embodiment thereof and in connection with a particular type of extrusion apparatus, it will be apparent that a great many changes and modifications can be made both in construction and application. Accordingly, such description is meant to be illustrative only and not restrictive to the scope of the invention as is set forth in the appended claims.

What is claimed is:

1. An apparatus for extruding a uniform-thickness plastic sheet, comprising a sheeting die, pump means for forcing viscous plastic material through said die to form said sheet, take-off means for withdrawing said sheet from said die, a first driving means for said pump means, a second driving means for said take-off means, means for adjusting the ratio of the speeds of said first and second driving means, a source of radiation and a radiation detector, means for mounting said source to direct said radiation into a surface of said sheet, means for mounting said detector in position to intercept modified radiation from said source which emerges from said sheet after interaction therewith, said source and detector mounting means including a frame, a track extending across the width of said sheet, and bearing means for movably supporting said frame on said track, reciprocating means for driving said frame on said track whereby said source and detector are caused to move periodically back and forth across said sheet for scanning the same, means for translating the response of said detector into a signal functional of the thickness of said sheet, integrator means having an input adapted for connection to said signal and an output providing an integrated signal representing the average value thereof, controller means energized by a predetermined value of said integrated signal for controlling said speed ratio adjusting means, and switching means responsive to the position of said frame on said track, said switching means including means for connecting said thickness-functional signal to said integrator input during a side-to-side movement of said source and detector across said sheet and means for subsequently connecting said integrated signal to said controller means.

2. An apparatus as in claim 1 wherein said pump means comprises an extruder screw, and wherein said ratio adjusting means comprises means for maintaining the speed of said take-off means substantially constant and means for adjusting the speed of said extruder screw.

3. An apparatus as in claim 1 wherein said reciprocating drive means includes speed-shift reversing means for driving said frame at a first speed in one direction and at a second substantially faster speed in the opposite direction, and wherein said switching means includes means for inactivating said integrator when said first speed obtains.

4. An apparatus as in claim 1 wherein said integrator means comprises a series network of a resistor and a capacitor and means for amplifying a voltage developed across said capacitor.

5. An apparatus as in claim 4 wherein said switching means includes timer means for interrupting the operation of said reciprocating drive means for a pre-set time interval when said frame is driven to one of its opposed limits of travel, and means for discharging said capacitor at the end of said interval to reset said integrator.

6. An apparatus as in claim 4 wherein the time-constant of said resistor-capacitor network exceeds the time required for said side-to-side movement, during which time said thickness-functional signal is connected to said integrator, by a factor of about five.

References Cited in the file of this patent

UNITED STATES PATENTS

| | | |
|---|---|---|
| 2,051,781 | Brown | Aug. 18, 1936 |
| 2,289,933 | Rankin | July 14, 1942 |
| 2,372,162 | Ryan | Mar. 20, 1945 |
| 2,540,146 | Stober | Feb. 6, 1951 |
| 2,566,854 | Rhodes | Sept. 4, 1951 |
| 2,687,052 | Zeitlin | Aug. 24, 1954 |
| 2,747,224 | Koch et al. | May 29, 1956 |
| 2,750,986 | Russell et al. | June 19, 1956 |
| 2,800,590 | Gilman | July 23, 1957 |
| 2,829,268 | Chope | Apr. 1, 1958 |
| 2,916,792 | Crook et al. | Dec. 15, 1959 |